United States Patent
Hu

(10) Patent No.: US 11,721,000 B2
(45) Date of Patent: Aug. 8, 2023

(54) IMAGE DENOISING METHOD AND APPARATUS, ELECTRONIC DEVICE AND NON-TRANSITORY COMPUTER READALBLE STORAGE MEDIUM

(71) Applicant: BOE Technology Group Co., Ltd., Beijing (CN)

(72) Inventor: Fengshuo Hu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 107 days.

(21) Appl. No.: 17/355,938

(22) Filed: Jun. 23, 2021

(65) Prior Publication Data
US 2022/0028041 A1    Jan. 27, 2022

(30) Foreign Application Priority Data
Jul. 27, 2020   (CN) .......................... 202010729938.2

(51) Int. Cl.
*G06T 5/00*    (2006.01)
*G06N 3/088*   (2023.01)
(Continued)

(52) U.S. Cl.
CPC ............. *G06T 5/002* (2013.01); *G06N 3/045* (2023.01); *G06N 3/088* (2013.01); *G06T 3/4046* (2013.01); *G06T 3/4053* (2013.01); *G06T 5/20* (2013.01); *G06T 5/50* (2013.01); *G06T 2207/10024* (2013.01); *G06T 2207/20081* (2013.01); *G06T 2207/20084* (2013.01)

(58) Field of Classification Search
CPC ..... G06T 5/002; G06T 3/4046; G06T 3/4053; G06T 5/20; G06T 5/50; G06T 2207/10024; G06T 2207/20081; G06T 2207/20084; G06N 3/0454; G06N 3/088; G06N 3/0472
See application file for complete search history.

(56) References Cited

U.S. PATENT DOCUMENTS

2019/0080205 A1*  3/2019  Kaufhold ................. G06N 3/08
2019/0197368 A1*  6/2019  Madani ................... G06N 3/082
(Continued)

OTHER PUBLICATIONS

Y. Wu, L. Lan, H. Long, G. Kong, X. Duan and C. Xu, "Image Super-Resolution Reconstruction Based on a Generative Adversarial Network," in IEEE Access, vol. 8, pp. 215133-215144, 2020, doi: 10.1109/ACCESS.2020.3040424. (Year: 2020).*

*Primary Examiner* — Andrae S Allison
(74) *Attorney, Agent, or Firm* — IPro, PLLC

(57) ABSTRACT

An image denoising method includes: acquiring a first data set and a second data set, where the first data set includes a plurality of first images without noise, the second data set includes a plurality of second images with real noise, contents of each first image and each second image are different; training, by using the first data set and the second data set, a first network to obtain a noise generation model; inputting the first image into the noise generation model, and outputting a third image with simulated noise; where a plurality of third images forms a third data set; training, by using the first data set and the third data set, an image denoising network to obtain an image denoising model. The image denoising model is configured to convert an original image with noise into an output image without noise.

18 Claims, 6 Drawing Sheets

(51) Int. Cl.
*G06T 3/40* (2006.01)
*G06T 5/20* (2006.01)
*G06T 5/50* (2006.01)
*G06N 3/045* (2023.01)

(56) References Cited

U.S. PATENT DOCUMENTS

2019/0198156 A1* 6/2019 Madani ................ G06V 10/764
2022/0092742 A1* 3/2022 Pei ......................... G06N 3/088

* cited by examiner

IMAGE DENOISING METHOD AND APPARATUS, ELECTRONIC DEVICE AND NON-TRANSITORY COMPUTER READALBLE STORAGE MEDIUM

CROSS-REFERENCE TO RELATED APPLICATION

The present application claims a priority of Chinese patent application No. 202010729938.2 filed on Jul. 27, 2020, which is incorporated herein by reference in its entirety.

TECHNICAL FIELD

The present disclosure relates to the field of image processing technology, and in particular to an image denoising method, an image denoising apparatus, an electronic device and a non-transitory computer readable storage medium.

BACKGROUND

An image super-resolution technology refers to restoring a high-resolution image from a low-resolution image or image sequence. High-resolution images have high pixel density and may provide more details, which often play a key role in practical applications. To obtain high-resolution images, the most direct method is to use high-resolution image sensors. However, due to the limit of the manufacturing process and cost of sensors and optical devices, it is difficult to implement this method in many occasions and wide-ranging arrangements. Therefore, it is of great practical significance to obtain high-resolution images through a super-resolution algorithm using a device in the related art.

SUMMARY

An image denoising method is provided, including: acquiring a first data set and a second data set, where the first data set includes a plurality of first images without noise, the second data set includes a plurality of second images with real noise, contents of each first image and each second image are different; training, by using the first data set and the second data set, a first network to obtain a noise generation model; inputting the first image into the noise generation model, and outputting a third image with simulated noise; where a plurality of third images forms a third data set; training, by using the first data set and the third data set, an image denoising network to obtain an image denoising model. The image denoising model is configured to convert an original image with noise into an output image without noise.

According to an embodiment of the present disclosure, the training the first network to obtain the noise generation model by using the first data set and the second data set includes: cutting or scaling the first image in the first data set to obtain a fourth image, where a plurality of fourth images forms a fourth data set; cutting or scaling the second image in the second data set to obtain a fifth image, where a plurality of fifth images forms a fifth image data set; and training, by using the fourth data set and the fifth data set, the first network to obtain the noise generation model.

According to an embodiment of the present disclosure, the first network includes a noise generation network and a discrimination network, and the training the first network to obtain the noise generation model by using the first data set and the second data set includes: training the noise generation network and the discrimination network alternately. When training the noise generation network, parameters of the discrimination network remain unchanged; and when training the discrimination network, parameters of the noise generation network remain unchanged.

According to an embodiment of the present disclosure, the training the noise generation network includes: inputting the first image into the noise generation network to obtain a first generated image with simulated noise; inputting the first generated image into the discrimination network to obtain a first discrimination result; obtaining a first loss in accordance with the first image, the first generated image and the first discrimination result; and performing parameter adjustment on the noise generation network in accordance with the first loss.

According to an embodiment of the present disclosure, the training the discrimination network includes: inputting the first image into the noise generation network after parameter adjustment, and outputting a second generated image with simulated noise; inputting the second generated image into the discrimination network to obtain a second discrimination result; inputting the second image into the discrimination network to obtain a third discrimination result; obtaining a second loss in accordance with the second discrimination result and the third discrimination result; and performing parameter adjustment on the discrimination network in accordance with the second loss.

According to an embodiment of the present disclosure, the inputting the first generated image into the discrimination network to obtain the first discrimination result includes: inputting the first generated image into a Gaussian high-pass filter to obtain a first intermediate image; and inputting the first intermediate image into the discrimination network to obtain the first discrimination result; the inputting the second generated image into the discrimination network to obtain the second discrimination result includes: inputting the second generated image into the Gaussian high-pass filter to obtain a second intermediate image; and inputting the second intermediate image into the discrimination network to obtain the second discrimination result; the inputting the second image into the discrimination network to obtain the third discrimination result includes: inputting the second image into the Gaussian high-pass filter to obtain a third intermediate image; and inputting the third intermediate image into the discrimination network to obtain the third discrimination result.

According to an embodiment of the present disclosure, the first loss includes a color loss, a perceptual loss and a texture loss, and the color loss is obtained through the following steps: inputting the first image and the first generated image into a Gaussian low-pass filter to obtain a first filtered image and a first generated filtered image; and obtaining the color loss in accordance with the first filtered image and the first generated filtered image.

According to an embodiment of the present disclosure, the first loss is calculated through the following formulas:

$$L_G = L_{col} + \alpha L_{tex} + \beta L_{per},$$

$$L_{col} = \left(\sum\nolimits_1^n \|F_L(G(x^{(i)})) - F_L(x^{(i)})\|_1\right)/n,$$

$$L_{tex} = \left(\sum\nolimits_1^n \log(1 - D(F_H(G(x^{(i)}))))\right)/n,$$

$$L_{per} = \left(\sum\nolimits_1^n \frac{1}{C_j H_j W_j} \|\varphi_j(G(x^{(i)})) - \varphi_j(x^{(i)})\|_2^2\right)/n$$

where, $L_G$ is the first loss, $L_{col}$ is the color loss, $L_{tex}$ is the texture loss, $L_{per}$ is the perceptual loss, n represents the number of images inputted in one iteration during training, a value range of i is [1, n], $X^{(i)}$ represents an i-th first image, $F_L$ represents a low-frequency feature obtained through Gaussian low-pass filtering, $F_H$ represents a high-frequency feature obtained through Gaussian high-pass filtering, D represents the discrimination network, G represents the noise generation network, j represents a j-th layer of a VGG network, $1/C_j H_j W_j$ represents a size of a feature map of the j-th layer of the VGG network, and Φ represents the VGG network.

According to an embodiment of the present disclosure, the second loss is calculated through the following formula:

$$L_D = (\Sigma_1^n [\log(1 - D(F_H(G(x^{(i)})))) + \log(-D(F_H(y^{(i)})))])/n$$

where $L_D$ is the second loss, and y represents the second image.

According to an embodiment of the present disclosure, the noise generation network includes 12 residual sub-networks, each residual sub-network includes a first convolutional layer and a second convolutional layer, an input end of the first convolutional layer is an input end of the residual sub-network, an output end of the first convolutional layer is connected to an input end of the second convolutional layer after a Rectified Linear Units (Relu) activation processing is performed on the output end of the first convolutional layer, an output end of the second convolutional layer is used as an output end of the residual sub-network, and the input end and the output end of the residual sub-network are connected to each other.

According to an embodiment of the present disclosure, prior to the inputting the first image into the noise generation model, the method further includes: converting the first image into a first training sample image; the inputting the first image into the noise generation model and outputting the third image with simulated noise includes: inputting the first training sample image into the noise generation model and outputting the third image, where a resolution of the first image is larger than a resolution of the first training sample image, and a resolution of the third image is the same as the resolution of the first training sample image. The image denoising model is further configured to convert the original image with noise and having a first resolution into the output image without noise and having a second resolution, and the first resolution is smaller than the second resolution.

A non-transitory computer readable storage medium storing therein an image denoising program is further provided. The image denoising program is executed by a processor to implement the above-mentioned image denoising method.

An electronic device is further provided, including: a memory, a processor and an image denoising program stored on the memory and executable on the processor, when the processor executes the program, the above image denoising method is implemented.

An image denoising apparatus is further provided, including: a first acquiring module, configured to acquire a first data set and a second data set, where the first data set includes a plurality of first images without noise, the second data set includes a plurality of second images with real noise, contents of each first image and each second image are different; a first training module, configured to train a first network to obtain a noise generation model by using the first data set and the second data set; a second acquiring module, configured to input the first image into the noise generation model, and output a third image with simulated noise; where a plurality of third images forms a third data set; and a second training module, configured to train an image denoising network to obtain an image denoising model by using the first data set and the third data set. The image denoising model is configured to convert an original image with noise into an output image without noise.

The additional aspects and advantages of the present disclosure will be given or may become apparent in the following description, or may be understood through the implementation of the present disclosure.

DETAILED DESCRIPTION

Figure 1:
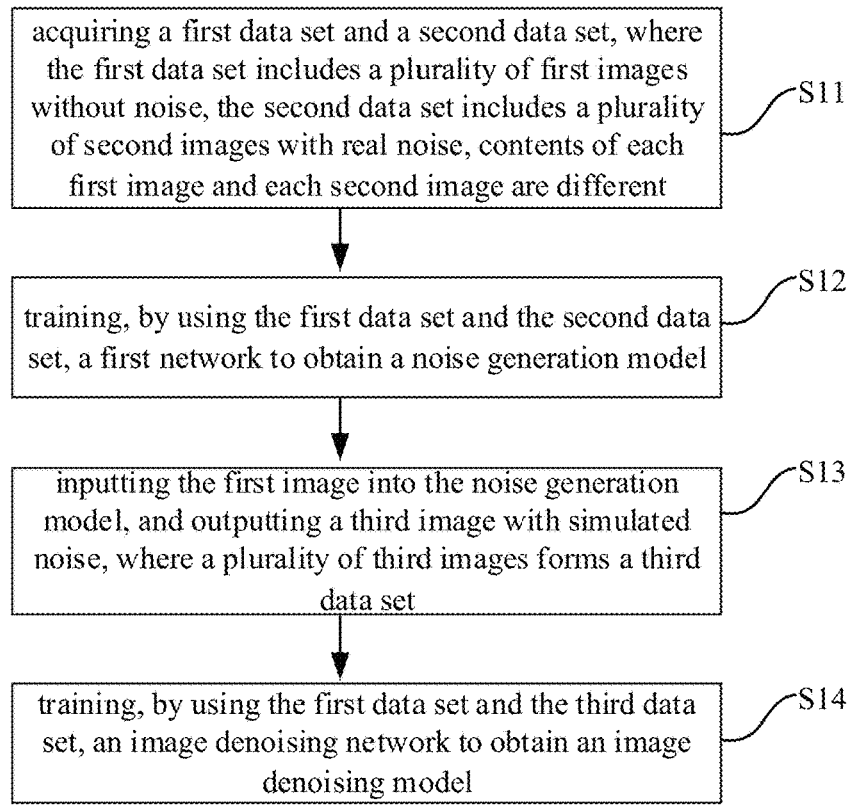
FIG. 1 is a flowchart of an image denoising method according to an embodiment of the present disclosure.

The embodiments of the present disclosure are described in detail below, and the examples of the embodiments are illustrated in the drawings. Identical or similar reference numbers in the drawings represent an identical or similar element or elements having an identical or similar function. The embodiments described below with reference to the accompanying drawings are illustrative, and are only used to explain the present disclosure, rather than being construed as limiting the present disclosure.

At present, super-resolution algorithms are trained mostly based on paired data sets to obtain models. When each model is applied to a low-resolution image of which a distribution is different from that of any one in the training data set, the image super-resolution effect is not good, and various artifacts may appear easily.

An object of the present disclosure is to solve at least one of the technical problems in the related art to some extent. In this regard, an image denoising method, a non-transitory computer readable storage medium, an electronic device, an image denoising apparatus and an image super-resolution denoising method are provided in the embodiments of the present disclosure, so as to obtain an image denoising network trained by using unpaired training sets and configured to convert a low-resolution image into a high-resolution image, thereby to improve the image super-resolution effect.

The image denoising method, the image denoising apparatus, the electronic device, and the image super-resolution denoising method of the embodiments of the present disclosure will be described with reference to FIGS. 1 to 9.

FIG. 1 is a flowchart of an image denoising method according to an embodiment of the present disclosure.

As shown in FIG. 1, the image denoising method includes the following steps S11 to S14.

S11, acquiring a first data set and a second data set, where the first data set includes a plurality of first images without noise, the second data set includes a plurality of second images with real noise, contents of each first image and each second image are different.

Figure 4:
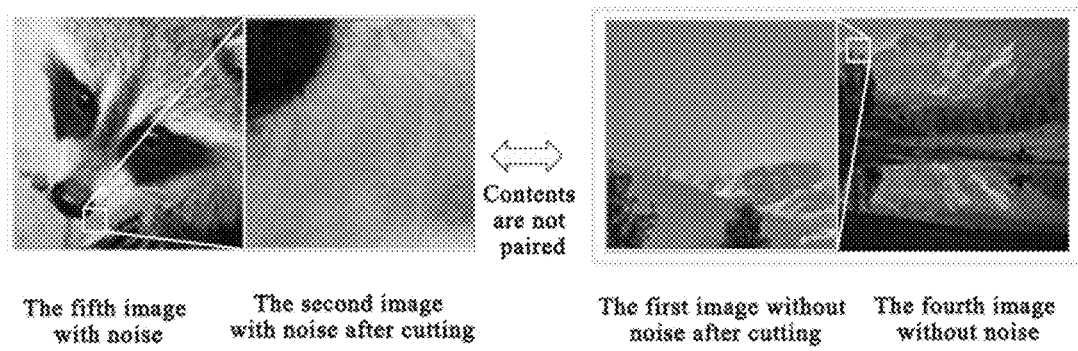
FIG. 4 is a schematic diagram of an image processing procedure according to an embodiment of the present disclosure.

Specifically, the training the first network to obtain the noise generation model by using the first data set and the second data set may include: cutting or scaling the first image in the first data set to obtain a fourth image, where a plurality of fourth images forms a fourth data set; cutting or scaling the second image in the second data set to obtain a fifth image, wherein a plurality of fifth images forms a fifth image data set; and training, by using the fourth data set and the fifth data set, the first network to obtain the noise generation model. The first data set and the second data set are used as unpaired training samples to train the first network. As shown in FIG. 4, a content of the fourth image without noise is different from a content of the fifth image with noise.

Specifically, when the first image without noise is cut into the fourth image without noise, and the second image with real noise is cut into the fifth image with real noise, it may be, for example, cutting 10,000 large images each of 1024*1024 into 160,000 small images each of 256*256. That is, each large image of a high-resolution may be cut into 16 small images each having a low-resolution of 256*256. When the first image without noise is scaled into the fourth image without noise, and the second image with real noise is scaled into the fifth image with real noise, it may be, for example, scaling 160000 large images each of 1024*1024 into 160,000 small images each of 256*256.

It should be appreciated that, when cutting is performed, an image block having a fixed size (such as 128, 256, 512) is selected in a random position of an image, so as to maintain a resolution of the image, and obtain more training samples than those obtained in an image scaling mode. Therefore, in order to obtain the same number of small images (i.e., the fourth images and the fifth images), as compared with a zoom-out processing, the number of larger images (i.e. the first images and the second images) that need to be processed is smaller in the above-mentioned cutting processing, so as to achieve faster processing speed and higher efficiency.

S12, training, by using the first data set and the second data set, a first network to obtain a noise generation model.

In some embodiments, the first network includes a noise generation network and a discrimination network, and the training the first network to obtain the noise generation model by using the first data set and the second data set includes: training the noise generation network and the discrimination network alternately; where when training the noise generation network, parameters of the discrimination network remain unchanged; and when training the discrimination network, parameters of the noise generation network remain unchanged.

In some embodiments, the first network is a Generative Adversarial Network (GAN).

The discrimination network may be a Visual Geometry Group (VGG) network or a Resnet network, or another network. An object of training the noise generation network is to make the third image with simulated noise generated by the noise generation network fool the discrimination network, so that the discrimination network cannot determine whether the third image generated by the noise generation network is true or fake, and thus a distribution of the generated simulated noise is more like a distribution of real noise. An object of training the discrimination network is to enable the discrimination network to determine that the third image with simulated noise and the second image with real noise are not a same image. A training phase of the noise generation network and a training phase of the discrimination network alternate. For example, the noise generation network training phase may be performed first, the discrimination network training phase may be performed subsequently, and the above training phases may be repeated continuously. It should be appreciated that an Nth to-be-trained noise generation network is obtained through adjusting parameters of an (N−1)th to-be-trained noise generation network, and an Nth to-be-trained discrimination network is obtained through adjusting parameters of an (N−1)th to-be-trained discrimination network, where N is an integer larger than or equal to 2.

Figure 2:
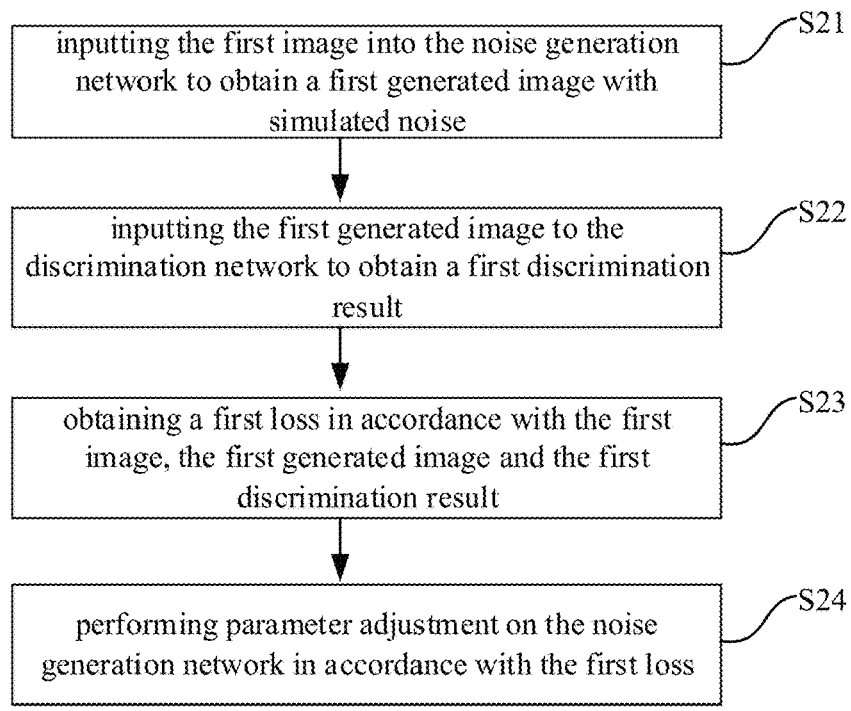
FIG. 2 is another flowchart of the image denoising method according to an embodiment of the present disclosure.

As an example, as shown in FIG. 2, the noise generation network are trained through the following steps S21 to S24.

S21, inputting the first image into the noise generation network to obtain a first generated image with simulated noise.

Optionally, the simulated noise added by the noise generation network to the above-mentioned first image may be Gaussian noise, or the simulated noise may be added by means of Gaussian blur, up and down sampling and the like.

S22, inputting the first generated image into the discrimination network to obtain a first discrimination result.

Figure 5:
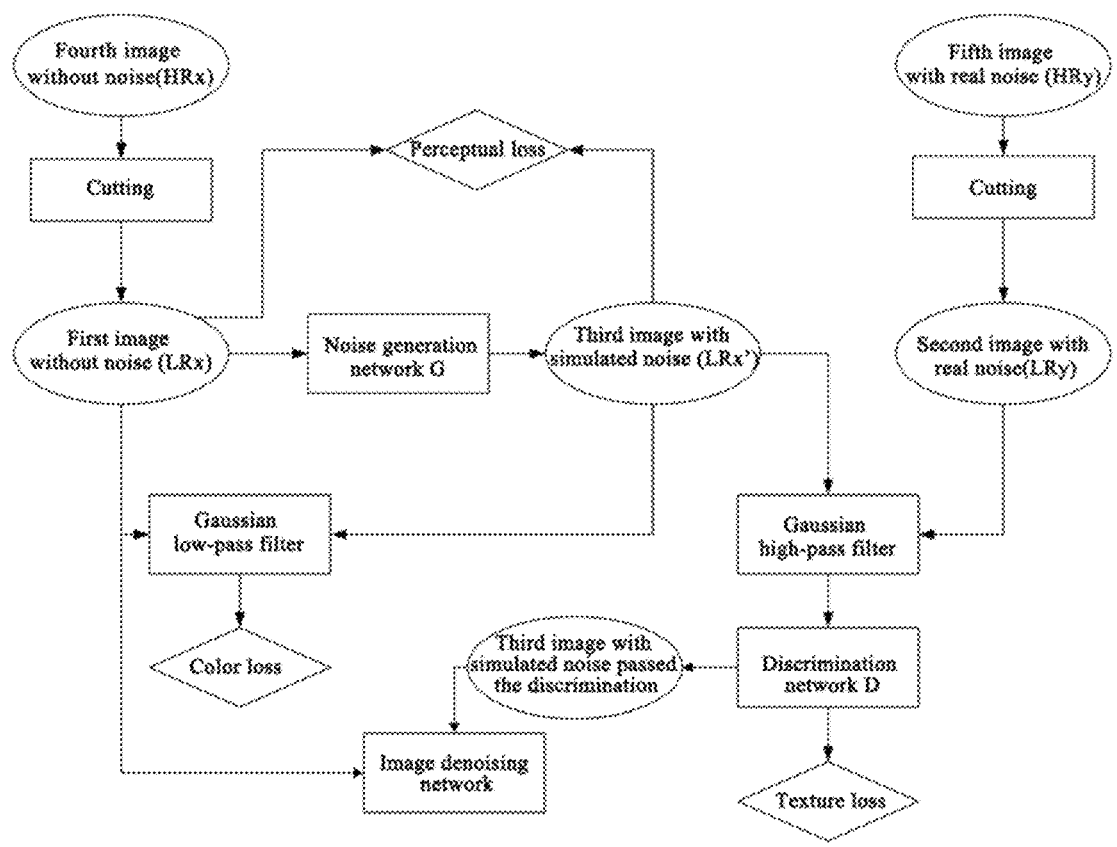
FIG. 5 is a training procedure by using unpaired images according to an embodiment of the present disclosure.

Specifically, as shown in FIG. 5, the first generated image is inputted into a Gaussian high-pass filter to obtain a first intermediate image, and the first intermediate image is inputted into the discrimination network to obtain a first discrimination result.

S23, obtaining a first loss in accordance with the first image, the first generated image and the first discrimination result.

The first loss includes a color loss, a perceptual loss, and a texture loss. The color loss, which is only measured at low frequencies, is used to represent a global loss of the third image relative to the first image. The perceptual loss is measured on entire frequencies, that is, it measures a close relationship between high frequencies and the low frequencies of the image. The texture loss, is used to measure whether a distribution of the generated simulated noise conforms to that of the real noise at high frequencies, and further used to represent a local loss of the third image relative to the first image.

Specifically, the first image and the first generated image are inputted into a Gaussian low-pass filter to obtain a first filtered image and a first generated filtered image; and the color loss is obtained in accordance with the first filtered image and the first generated filtered image.

As an example, the color loss may be calculated through the following formula $$L_{col}=(\Sigma_1^n \|F_L(G(x^{(i)}))-F_L(x^{(i)})\|_1)/n.$$

$L_{col}$ is the color loss, $F_L$ represents a low-frequency feature obtained through Gaussian low-pass filtering, n represents the number of images inputted in one iteration during training, a value range of i is [1, n], and $x^{(i)}$ represents an i-th first image, G represents the noise generation network.

The texture loss may be calculated through the following formula $$L_{tex} = (\Sigma_1^n \log(1 - D(F_H(G(x^{(i)})))))/n.$$

$L_{tex}$ is the texture loss, n represents the number of images inputted in one iteration during training, $F_H$ represents a high-frequency feature obtained through Gaussian high-pass filtering, and D represents the discrimination network.

Optionally, a VGG loss may be used as the perceptual loss, that is, input and output images are inputted into a VGG network, and feature maps of the VGG network at some layers may be used to calculate the loss. For example, the perceptual loss may be calculated through the following formula $$L_{per} = \left(\sum_1^n \frac{1}{C_j H_j W_j} \|\varphi_j(G(x^{(i)})) - \varphi_j(x^{(i)})\|_2^2\right)/n,$$

where j represents a j-th layer of the VGG network, $1/C_j H_j W_j$ represents a size of a feature map of the j-th layer of the VGG network, and $\Phi$ represents the VGG network.

Furthermore, the first loss is calculated through the following formula $$L_G = L_{col} + \alpha L_{tex} + \beta L_{per}.$$

$L_G$ is the first loss, and $L_{per}$ is the perceptual loss.

S24, performing parameter adjustment on the noise generation network in accordance with the first loss.

It should be appreciated that the above noise generation network includes 12 residual sub-networks, each residual sub-network includes a first convolutional layer and a second convolutional layer, an input end of the first convolutional layer is an input end of the residual sub-network, an output end of the first convolutional layer is connected to an input end of the second convolutional layer after a Rectified Linear Units (Relu) activation processing is performed on the output end of the first convolutional layer, an output end of the second convolutional layer is used as an output end of the residual sub-network, and the input end and the output end of the residual sub-network are connected to each other.

Figure 3:
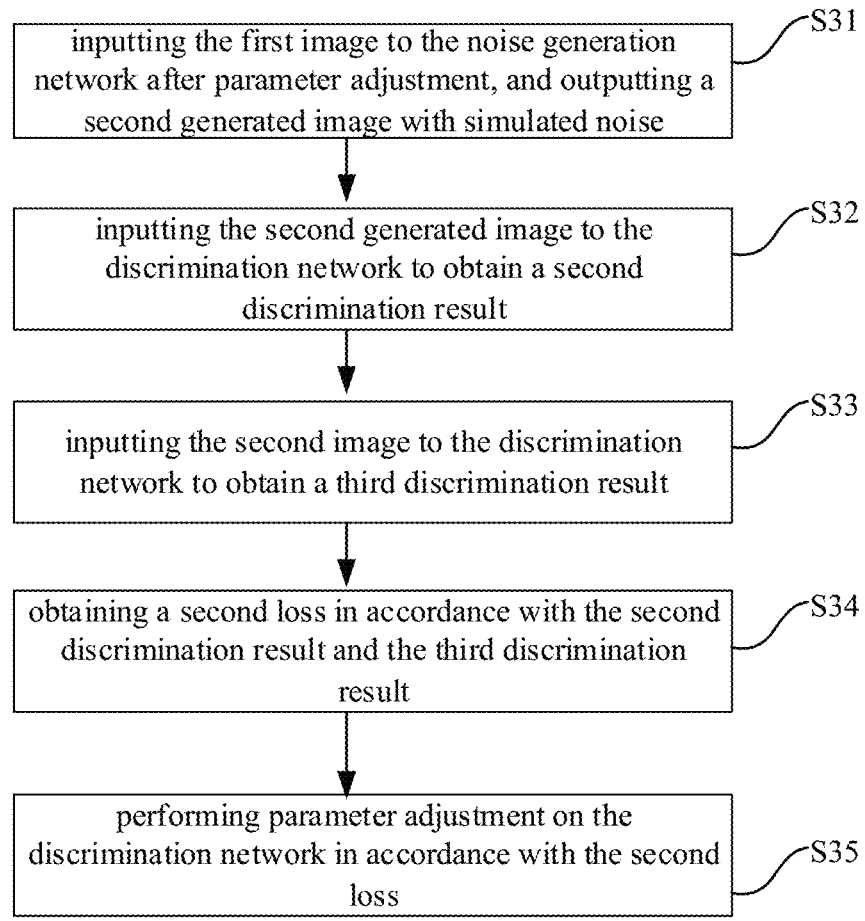
FIG. 3 is yet another flowchart of the image denoising method according to an embodiment of the present disclosure.

Further, the discrimination network is trained. As an example, as shown in FIG. 3, the discrimination network is trained through the following steps S31 to S35.

S31, inputting the first image into the noise generation network after parameter adjustment, and outputting a second generated image with simulated noise.

S32, inputting the second generated image into the discrimination network to obtain a second discrimination result.

Specifically, the second generated image is inputted into the Gaussian high-pass filter to obtain a second intermediate image, and the second intermediate image is inputted into the discrimination network to obtain the second discrimination result.

S33, inputting the second image into the discrimination network to obtain a third discrimination result.

Specifically, the second image is inputted into the Gaussian high-pass filter to obtain a third intermediate image, and the third intermediate image is inputted into the discrimination network to obtain the third discrimination result.

S34, obtaining a second loss in accordance with the second discrimination result and the third discrimination result.

Specifically, the second loss is calculated through the following formula $$L_D = (\Sigma_1^n [\log(1 - D(F_H(G(x^{(i)})))) + \log(-D(F_H(y^{(i)})))])/n.$$

$L_D$ is the second loss, and $y^{(i)}$ represents an i-th second image.

S35, performing parameter adjustment on the discrimination network in accordance with the second loss.

Further, the above-mentioned noise generation network training phase and the discrimination network training phase are repeated until the second loss of the discrimination network meets a preset condition, at this time, the third image with simulated noise may "fool" the discrimination network.

It should be appreciated that, the Gaussian low-pass filter and the Gaussian high-pass filter are used to separate high and low frequency information of the image, and to perform targeted constraints. Internal structures of the noise generation network and the discrimination network may be designed as required, but an overall adversarial structure of the noise generation network+the authentication network needs to be maintained.

S13, inputting the first image into the noise generation model, and outputting a third image with simulated noise, where a plurality of third images forms a third data set.

S14, training, by using the first data set and the third data set, an image denoising network to obtain an image denoising model.

Specifically, as shown in FIG. 5, since the third image with simulated noise passed the discrimination is more like the second image with real noise, the first image without noise and the third image with simulated noise passed the discrimination are inputted into the image denoising network as paired training samples for training, so as to obtain a trained image denoising model. Through the image denoising model, it is able to not only improve the definition of images with real noise, but also mitigate the problem of super-resolution artifacts.

Further, the image denoising model is used to convert an original image with noise into an output image without noise.

Figure 6:
FIG. 6 is a low-resolution image to be inputted into a trained image denoising network according to an embodiment of the present disclosure.
Figure 7:
FIG. 7 is a high-resolution image outputted by a trained image denoising network according to an embodiment of the present disclosure.

As an example, the original image with noise shown in FIG. 6 is inputted into the image denoising model, and the image denoising model may output the output image without noise, as shown in FIG. 7. As compared with FIG. 6, the definition of the image in FIG. 7 is well improved and super-resolution artifacts are well mitigated in FIG. 7.

In the image denoising method of the embodiments of the present disclosure, it is able to obtain the image denoising network trained by using unpaired training sets and configured to convert a low-resolution image into a high-resolution image, so as to improve the image super-resolution effect.

Further, a non-transitory computer readable storage medium is further provided in the present disclosure.

The non-transitory computer readable storage medium of the embodiments of the present disclosure stores an image denoising program therein, the image denoising program is executed by a processor to implement the above image denoising method.

In the non-transitory computer readable storage medium of the embodiments of the present disclosure, when the image denoising program stored therein is executed by a processor, it is able to obtain the image denoising network trained by using unpaired training sets and configured to convert a low-resolution image into a high-resolution image, so as to improve the image super-resolution effect.

Further, an electronic device is provided in the present disclosure.

Figure 8:
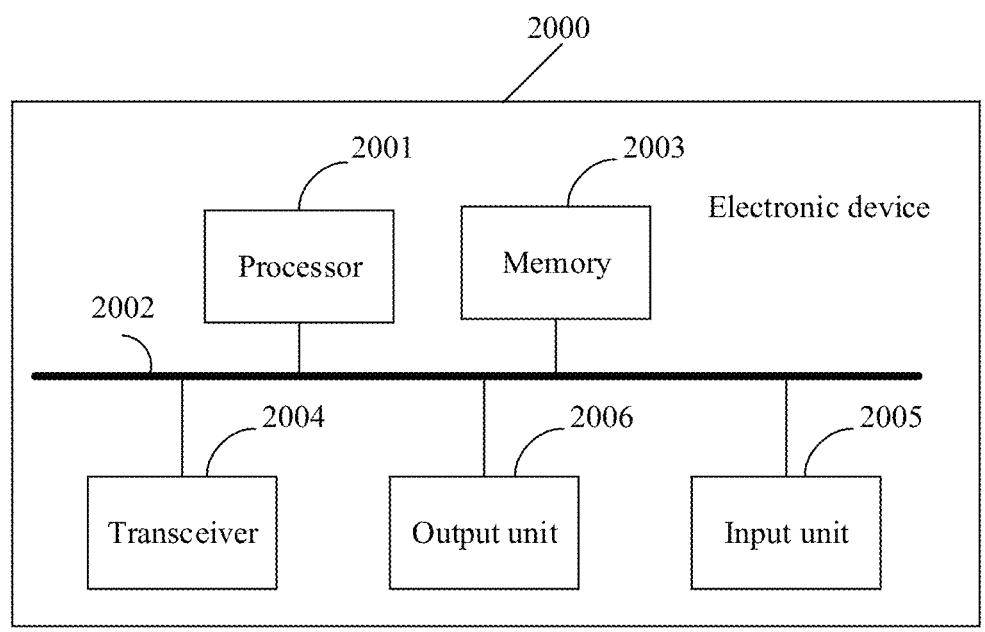
FIG. 8 is a structural diagram of an electronic device according to an embodiment of the present disclosure.

As shown in FIG. 8, the electronic device 2000 of the embodiments of the present disclosure includes: a memory 2003, a processor 2001 and an image denoising program stored on the memory and executable on the processor, the image denoising program is executed by the processor to implement the above image denoising method.

The processor 2001 is electrically connected to the memory 2003, e.g., via a bus 2002.

The processor 2001 may be a Central Processing Unit (CPU), a general-purpose processor, a Digital Signal Processor (DSP), an Application Specific Integrated Circuit (ASIC), an Field-Programmable Gate Array (FPGA) or another programmable logic device, a transistor logic device, a hardware component or any combination thereof. It is able to implement or carry out the various illustrative logical blocks, modules and circuits described in combination with the content in the present disclosure. The processor 2001 may also be a combination for realizing computing functions, such as a combination of one or more microprocessor, a combination of a DSP and a microprocessor and the like.

The bus 2002 may include a path for transferring information among the components described above. The bus 2002 may be a Peripheral Component Interconnect (PCI) bus or an Extended Industry Standard Architecture (EISA) bus and the like. The bus 2002 may be divided into an address bus, a data bus, a control bus and the like. For ease of representation, only one thick line is shown in FIG. 8, but it does not mean that there is only one bus or one type of bus.

The memory 2003 may be a Read-Only Memory (ROM) or another type of static storage device capable of storing static information and instructions, a random access memory (RAM) or another type of dynamic storage device capable of storing information and instructions, or may be an Electrically Erasable Programmable Read Only Memory (EEPROM), a Compact Disc Read-Only Memory (CD-ROM) or another optical disk storage, an optical disk storage (including a compact disc, a laser disc, an optical disc, a digital versatile disc, a Blu-ray disc, etc.), a magnetic disk storage medium or another magnetic storage device, or may be used to carry or store desired program codes in the form of instructions or data structures and may be any other medium accessed by the computer, which will not be particularly defined herein.

Optionally, the electronic device 2000 may further include a transceiver 2004 for signal reception and transmission. The transceiver 2004 may enable the electronic device 2000 to exchange data with other devices through wireless or wired communication. It should be appreciated that, in practical applications, the number of transceivers 2004 is not limited to one.

Optionally, the electronic device 2000 may further include an input unit 2005 configured to receive digital, character, image and/or acoustic information, or generate a key signal input related to user settings and function control of the electronic device 2000. The input unit 2005 may include, but not limited to, one or more of a touch panel, a physical keyboard, a functional button (e.g., a volume control button or an on/off button), a trackball, a mouse, a joystick, a capture apparatus, a pickup and the like.

Optionally, the electronic device 2000 may further includes an output unit 2006 configured to output or display the information processed by the processor 2001. The output unit 2006 may include, but is not limited to, one or more of a display device, a speaker, a vibration device and the like.

Although FIG. 8 shows the electronic device 2000 having various apparatuses, it should be appreciated that it is not required to implement or have all of the shown components. It may alternatively be implemented or provided with more or fewer components.

In the electronic device of the embodiments of the present disclosure, by implementing the above image denoising method, it is able to obtain an image denoising network trained by using unpaired training sets and configured to convert a low-resolution image into a high-resolution image, so as to improve the image super-resolution effect.

Figure 9:
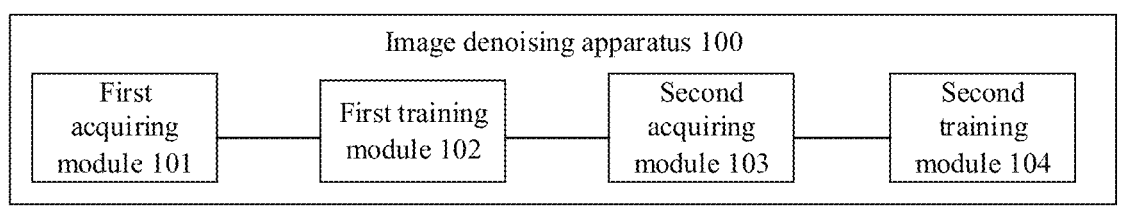
FIG. 9 is a structural diagram of an image denoising apparatus according to an embodiment of the present disclosure.

FIG. 9 is a structural diagram of an image denoising apparatus according to an embodiment of the present disclosure.

As shown in FIG. 9, the image denoising apparatus 100 includes: a first acquiring module 101, a first training module 102, a second acquiring module 103 and a second training module 104.

Specifically, the first acquiring module 101 is configured to acquire a first data set and a second data set, where the first data set includes a plurality of first images without noise, the second data set includes a plurality of second images with real noise, contents of each first image and each second image are different; the first training module 102 is configured to train a first network to obtain a noise generation model by using the first data set and the second data set; the second acquiring module 103 is configured to input the first image into the noise generation model, and output a third image with simulated noise; where a plurality of third images forms a third data set; and the second training module 104 is configured to train an image denoising network to obtain an image denoising model by using the first data set and the third data set. The image denoising model is configured to convert an original image with noise into an output image without noise.

In the image denoising apparatus, it is able to obtain the image denoising network trained through unpaired training sets and configured to convert a low-resolution image into a high-resolution image, so as to improve the image super-resolution effect.

In an embodiment of the present disclosure, the first acquiring module 101 is specifically configured to cut or scale the first image in the first data set to obtain a fourth image, where a plurality of fourth images forms a fourth data set; cut or scale the second image in the second data set to obtain a fifth image, where a plurality of fifth images forms a fifth image data set; train the first network to obtain the noise generation model by using the fourth data set and the fifth data set.

In an embodiment of the present disclosure, the first network includes a noise generation network and a discrimination network, and the first training module 102 is specifically configured to, train the noise generation network and the discrimination network alternately; where when training the noise generation network, parameters of the discrimination network remain unchanged; and when training the discrimination network, parameters of the noise generation network remain unchanged.

In an embodiment of the present disclosure, the first training module 102 is specifically configured to implement the following steps to train the noise generation network: inputting the first image into the noise generation network to obtain a first generated image with simulated noise; inputting the first generated image into the discrimination network to obtain a first discrimination result; obtaining a first loss in accordance with the first image, the first generated image and the first discrimination result; performing parameter adjustment on the noise generation network in accordance with the first loss.

The first training module 102 is further configured to implement the following steps to train the discrimination network: inputting the first image into the noise generation network after parameter adjustment, and outputting a second generated image with simulated noise; inputting the second generated image into the discrimination network to obtain a second discrimination result; inputting the second image into the discrimination network to obtain a third discrimination result; obtaining a second loss in accordance with the second discrimination result and the third discrimination result; performing parameter adjustment on the discrimination network in accordance with the second loss.

In an embodiment of the present disclosure, the first training module 102 is further configured to: input the first generated image into a Gaussian high-pass filter to obtain a first intermediate image, and input the first intermediate image into the discrimination network to obtain the first discrimination result.

The first training module 102 is further configured to: input the second generated image into the Gaussian high-pass filter to obtain a second intermediate image, and input the second intermediate image into the discrimination network to obtain the second discrimination result.

The first training module 102 is further configured to: input the second image into the Gaussian high-pass filter to obtain a third intermediate image, and input the third intermediate image into the discrimination network to obtain the third discrimination result.

In an embodiment of the present disclosure, the first training module 102 is further configured to input the first image and the first generated image into a Gaussian low-pass filter to obtain a first filtered image and a first generated filtered image; and obtain the color loss in accordance with the first filtered image and the first generated filtered image.

Further, the first loss is calculated through the following formulas:

$$L_G = L_{col} + \alpha L_{tex} + \beta L_{per},$$

$$L_{col} = \left(\sum\nolimits_1^n \|F_L(G(x^{(i)})) - F_L(x^{(i)})\|_1\right)/n,$$

$$L_{tex} = \left(\sum\nolimits_1^n \log(1 - D(F_H(G(x^{(i)}))))\right)/n,$$

$$L_{per} = \left(\sum\nolimits_1^n \frac{1}{C_j H_j W_j} \|\varphi_j(G(x^{(i)})) - \varphi_j(x^{(i)})\|_2^2\right)/n$$

where, $L_G$ is the first loss, $L_{col}$ is the color loss, $L_{tex}$ is the texture loss, $L_{per}$ is the perceptual loss, n represents the number of images inputted in one iteration during training, a value range of i is [1, n], $X^{(i)}$ represents an i-th first image, $F_L$ represents a low-frequency feature obtained through Gaussian low-pass filtering, $F_H$ represents a high-frequency feature obtained through Gaussian high-pass filtering, D represents the discrimination network, G represents the noise generation network, j represents a j-th layer of a VGG network, $1/C_j H_j W_j$ represents a size of a feature map of the j-th layer of the VGG network, and $\Phi$ represents the VGG network.

In an embodiment of the present disclosure, the first training module 102 is further configured to calculate the second loss through the following formula:

$$L_D = (\Sigma_1^n [\log(1 - D(F_H(G(x^{(i)})))) + \log(-D(F_H(y^{(i)})))])/n$$

where $L_D$ is the second loss, and y represents the second image.

In an embodiment of the present disclosure, the first acquiring module 101 is further configured to convert the first image into a first training sample image, and the second acquiring module 103 is further configured to input the first training sample image into the noise generation model and output the third image, where a resolution of the first image is larger than a resolution of the first training sample image, and a resolution of the third image is the same as the resolution of the first training sample image. The image denoising model is further configured to convert the original image with noise and having a first resolution into the output image without noise and having a second resolution, and the first resolution is smaller than the second resolution.

It should be appreciated that, other specific implementations of the image denoising apparatus in the embodiments of the present disclosure may refer to the image denoising method in the foregoing embodiment.

In the image denoising apparatus of the embodiments of the present disclosure, a super-resolution algorithm trained by using unpaired training sets may be applied to a low-resolution image obtained through an unknown degradation model, so as to improve the super-resolution effect in a real scene and improve the image quality and the definition of the image.

Figure 10:
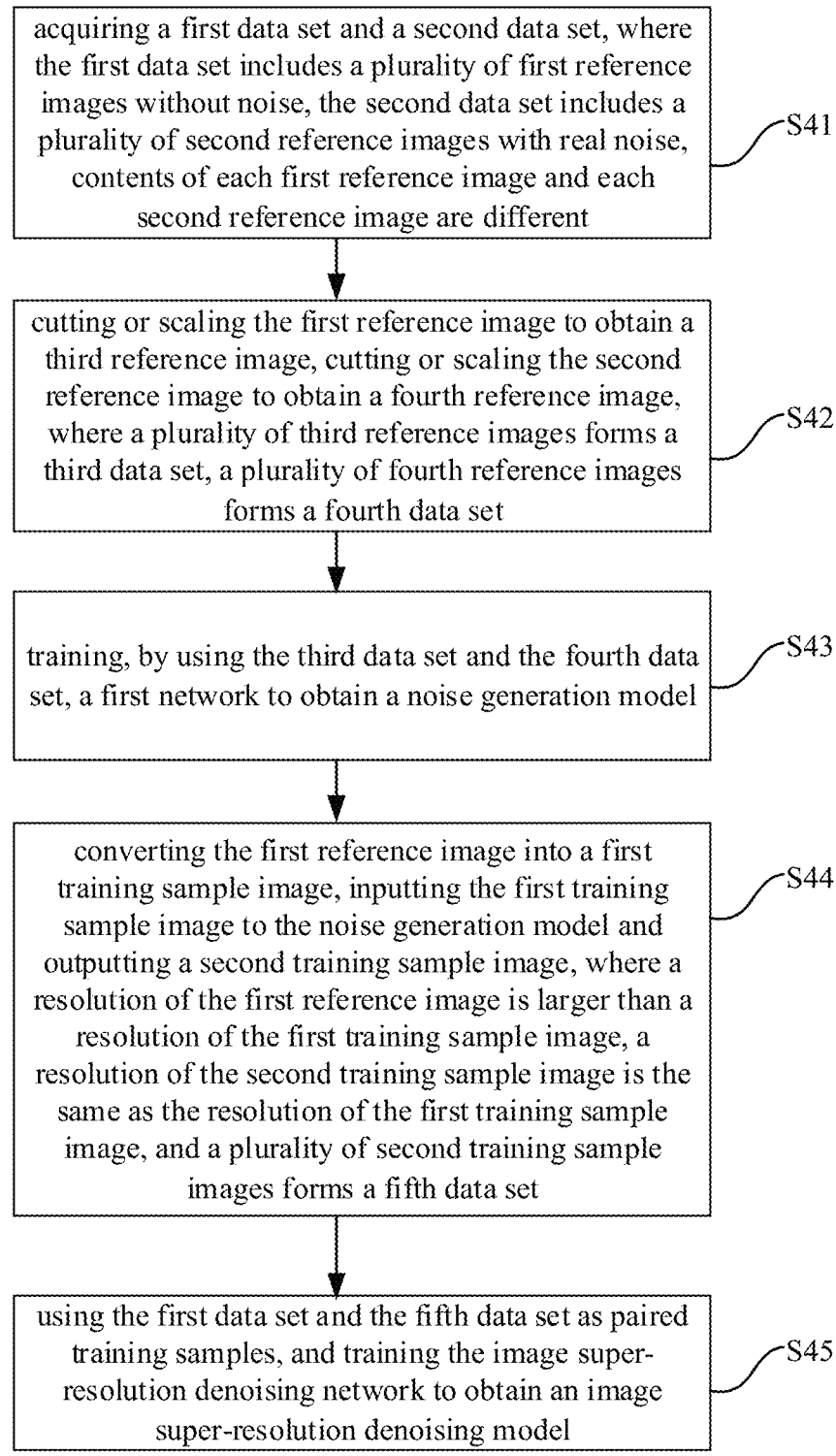
FIG. 10 is a flowchart of an image super-resolution denoising method according to an embodiment of the present disclosure.

FIG. 10 is a flowchart of an image super-resolution denoising method according to an embodiment of the present disclosure.

As shown in FIG. 10, the image super-resolution denoising method includes the following steps S41 to S45.

S41, acquiring a first data set and a second data set, where the first data set includes a plurality of first reference images without noise, the second data set includes a plurality of second reference images with real noise, contents of each first reference image and each second reference image are different.

S42, cutting or scaling the first reference image to obtain a third reference image, cutting or scaling the second reference image to obtain a fourth reference image, where a plurality of third reference images forms a third data set, a plurality of fourth reference images forms a fourth data set.

S43, training, by using the third data set and the fourth data set, a first network to obtain a noise generation model.

In some embodiments, the first network includes a noise generation network and a discrimination network, and the training the first network to obtain the noise generation model by using the first data set and the second data set includes: training the noise generation network and the discrimination network alternately; where when training the noise generation network, parameters of the discrimination network remain unchanged; and when training the discrimination network, parameters of the noise generation network remain unchanged.

In some embodiments, the first network is a Generative Adversarial Network (GAN).

The training the noise generation network includes: inputting the third reference image into the noise generation network to obtain a first reference generated image with simulated noise; inputting the first reference generated image into the discrimination network to obtain a first reference discrimination result; obtaining a first loss in accordance with the third reference image, the first reference generated image and the first reference discrimination result; and performing parameter adjustment on the noise generation network in accordance with the first loss. The training the discrimination network includes: inputting the third reference image into the noise generation network after parameter adjustment, and outputting a second reference generated image with simulated noise; inputting the second reference generated image into the discrimination network to obtain a second reference discrimination result; inputting the fourth reference image into the discrimination network to obtain a third reference discrimination result; obtaining a second loss in accordance with the second reference discrimination result and the third reference discrimination result; and performing parameter adjustment on the discrimination network in accordance with the second loss.

It should be appreciated that, the noise generation network includes 12 residual sub-networks, each residual sub-network includes a first convolutional layer and a second convolutional layer, an input end of the first convolutional layer is an input end of the residual sub-network, an output end of the first convolutional layer is connected to an input end of the second convolutional layer after a Rectified Linear Units (Relu) activation processing is performed on the output end of the first convolutional layer, an output end of the second convolutional layer is used as an output end of the residual sub-network, and the input end and the output end of the residual sub-network are connected to each other. The noise generation network and the discrimination network are trained alternately.

The inputting the first reference generated image into the discrimination network to obtain the first reference discrimination result includes: inputting the first reference generated image into a Gaussian high-pass filter to obtain a first reference intermediate image; and inputting the first reference intermediate image into the discrimination network to obtain the first reference discrimination result. The inputting the second reference generated image into the discrimination network to obtain the second reference discrimination result includes: inputting the second reference generated image into the Gaussian high-pass filter to obtain a second reference intermediate image; and inputting the second reference intermediate image into the discrimination network to obtain the second reference discrimination result. The inputting the fourth reference generated image into the discrimination network to obtain the third discrimination result includes: inputting the fourth reference image into the Gaussian high-pass filter to obtain a third reference intermediate image; and inputting the third reference intermediate image into the discrimination network to obtain the third reference discrimination result.

The above first loss is calculated through the following formulas:

$$L_G = L_{col} + \alpha L_{tex} + \beta L_{per},$$

$$L_{col} = \left(\sum_{1}^{n} \|F_L(G(x^{(i)})) - F_L(x^{(i)})\|_1\right)/n,$$

$$L_{tex} = \left(\sum_{1}^{n} \log(1 - D(F_H(G(x^{(i)}))))\right)/n,$$

$$L_{per} = \left(\sum_{1}^{n} \frac{1}{C_j H_j W_j} \|\varphi_j(G(x^{(i)})) - \varphi_j(x^{(i)})\|_2^2\right)/n$$

where, $L_G$ is the first loss, $L_{col}$ is the color loss, $L_{tex}$ is the texture loss, $L_{per}$ is the perceptual loss, n represents the number of images inputted in one iteration during training, a value range of i is [1, n], $X^{(i)}$ represents an i-th third image, $F_L$ represents a low-frequency feature obtained through Gaussian low-pass filtering, $F_H$ represents a high-frequency feature obtained through Gaussian high-pass filtering, D represents the discrimination network, G represents the noise generation network, j represents a j-th layer of a VGG network, $1/C_j H_j W_j$ represents a size of a feature map of the j-th layer of the VGG network, and $\Phi$ represents the VGG network.

The method for obtaining the color loss specifically includes: inputting the third reference image and the first reference generated image into a Gaussian low-pass filter to obtain a first reference filtered image and a first reference generated filtered image; and obtaining the color loss in accordance with the first reference filtered image and the first reference generated filtered image.

The second loss is calculated through the following formula:

$$L_D = (\Sigma_1^n [\log(1 - D(F_H(G(x^{(i)})))) + \log(-D(F_H(y^{(i)})))])/n$$

where $L_D$ is the second loss, and y represents the fourth reference image.

S44, converting the first reference image into a first training sample image, inputting the first training sample image into the noise generation model and outputting a second training sample image, where a resolution of the first reference image is larger than a resolution of the first training sample image, a resolution of the second training sample image is the same as the resolution of the first training sample image, and a plurality of second training sample images forms a fifth data set.

The first reference image may be converted into the first training sample image through down-sampling processing. For example, the first reference image without noise may be down-sampled to obtain the fifth reference image, and the fifth reference image is input into the noise generation model G shown in FIG. 5, so as to obtain a third reference generated image with simulated noise. The third reference generated image with simulated noise and the first reference image without noise are paired training data, and used to train a super-resolution denoising network.

S45, using the first data set and the fifth data set as paired training samples, and training the image super-resolution denoising network to obtain an image super-resolution denoising model.

Further, the image super-resolution denoising model is configured to convert an original image with noise and having a first resolution into a new image without noise and having a second resolution. The first resolution is smaller than the second resolution.

In the image super-resolution denoising method of the embodiments of the present disclosure, it is able to obtain an image denoising network trained by using unpaired training sets and configured to convert a low-resolution image into a high-resolution image, so as to improve the image super-resolution effect.

It should be appreciated that, the logic and/or steps in the flowcharts or otherwise described herein, for example, may be considered as an ordered list of executable instructions for implementing logical functions, and may be realized in any non-transitory computer-readable medium for use by or in combination with an instruction execution system, apparatus, or device (e.g., a computer-based system, a system including a processor, or another system that may acquire instructions from the instruction execution system, apparatus, or device and execute the instructions). For the purposes of this specification, a "non-transitory computer-readable medium" may be any apparatus that may include, store, communicate, propagate or transmit a program for use in the instruction execution system, apparatus, or device, or a combination thereof. More particular examples (non-exhaustive list) of the non-transitory computer-readable medium include: an electric connection part (electronic device) including one or more wirings, a portable computer disk box (magnetic device), a random access memory (RAM), a read only memory (ROM), an erasable programmable read only memory (EPROM) or a flash memory, an optional fiber device and a portable optical disk read only memory. In addition, since the program may be acquired electronically, for example by optical scanning of paper or other medium, followed by editing, interpretation or, when necessary, processing in another suitable manner, and storing it in a computer storage, the non-transitory computer-readable medium may even be a paper or other suitable medium on which the program may be printed.

It should be appreciated that various parts of the present disclosure may be implemented by hardware, software, firmware or a combination thereof. In the above-described embodiments, multiple steps or methods may be implemented in software or firmware stored in a memory and executed by a suitable instruction execution system. For example, in the case where the multiple steps or methods are implemented by hardware, similar to another embodiment, the steps or methods may be implemented by using any one or a combination of the following technologies that are commonly known in the art: a discrete logic circuit of a logic gate circuit configured to implement logic function on data signals, a specific integrated circuit having a suitable combinational logic gate circuit, a programmable gate array (PGA), a field-programmable gate array (FPGA), and the like.

In the description of this specification, the description referring to the terms of "one embodiment", "some embodiments", "examples", "specific examples", or "some examples" means specific features, structures, materials or characteristics in the embodiment or examples may be comprised in at least one embodiment or example of the present disclosure. In this specification, the schematic expression of the above terms does not necessarily refer to a same embodiment or example. Moreover, the specific features, structures, materials, or characteristics may be combined in an appropriate manner in any one or more embodiments or examples.

In the description of the present disclosure, it should be appreciated that the orientation or positional relationship indicated by the terms "in the middle of", "longitudinal", "transverse", "length", "width", "thickness", "on/above", "under/below", "front", "back", "left", "right", "vertical", "horizontal", "top", "bottom", "inside", "outside", "clockwise", "counterclockwise", "axial", "radial", "circumferential" may be used to indicate directions or positions as viewed in the drawings, and they are merely used to facilitate the description in the present disclosure, rather than to indicate or imply that a device or member must be arranged or operated at a specific position, and therefore should not be construed as limiting the present disclosure.

Furthermore, the terms "first" and "second" are merely for illustrative purposes, rather than to implicitly or explicitly indicate the number or priority of the defined technical features. In this regard, the technical features defined with such words as "first" and "second" may implicitly or explicitly include one or more technical features. Further, such a phrase as "a plurality of" is used to indicate that there are at least two, e.g., two or three, components, unless otherwise specified.

Unless otherwise specified, such words as "install", "connect" and "fix" may have a general meaning, e.g., fixed connection, detachable connection or integral connection, a mechanical connection or an electrical connection, or direct connection or indirect connection via an intermediate component, communication between two components or an internal communication between two elements or an interaction between two elements. The meanings of these words may be understood by a person skilled in the art according to the practical need.

Unless otherwise specified, when a first feature is "on" or "under" a second feature, it may indicate that the first feature and the second feature are in direct contact, or the first feature and the second feature are in indirect contact via an intermediate medium. Moreover, when the first feature is "above", "over", and "on" the second feature, it may indicate that the first feature is directly above or obliquely above the second feature, or simply indicate that a horizontal height of the first feature is higher than a horizontal height of the second feature. When the first feature is "below", "under", and "underside" the second feature, it may indicate that the first feature is directly or obliquely below the second feature, or simply indicate that a horizontal height of the first feature is lower than a horizontal height of the second feature.

Although the embodiments of the present disclosure have been shown and described above, it should be appreciated that the above-mentioned embodiments are for illustrative purposes only and should not be construed as limiting the present disclosure, and those of ordinary skill in the art may make changes, modifications, substitutions and variations to the above-mentioned embodiments within the scope of the present disclosure.

What is claimed is:

1. An image denoising method, comprising:
acquiring a first data set and a second data set, wherein the first data set comprises a plurality of first images without noise, the second data set comprises a plurality of second images with real noise, contents of each first image and each second image are different;
training, by using the first data set and the second data set, a first network to obtain a noise generation model;
inputting the first image into the noise generation model, and outputting a third image with simulated noise, wherein a plurality of third images forms a third data set; and
training, by using the first data set and the third data set, an image denoising network to obtain an image denoising model;
wherein the image denoising model is configured to convert an original image with noise into an output image without noise;
wherein prior to the inputting the first image into the noise generation model, the method further comprises:
converting the first image into a first training sample image;
the inputting the first image into the noise generation model and outputting the third image with simulated noise, comprises:
inputting the first training sample image into the noise generation model and outputting the third image, wherein a resolution of the first image is larger than a resolution of the first training sample image, and a resolution of the third image is the same as the resolution of the first training sample image;
wherein the image denoising model is further configured to convert the original image with noise and having a first resolution into the output image without noise and having a second resolution, and the first resolution is smaller than the second resolution.

2. The image denoising method according to claim 1, wherein the training the first network to obtain the noise generation model by using the first data set and the second data set comprises:
cutting or scaling the first image in the first data set to obtain a fourth image, wherein a plurality of fourth images forms a fourth data set;
cutting or scaling the second image in the second data set to obtain a fifth image, wherein a plurality of fifth images forms a fifth image data set; and
training, by using the fourth data set and the fifth data set, the first network to obtain the noise generation model.

3. The image denoising method according to claim 1, wherein the first network comprises a noise generation network and a discrimination network, and the training the first network to obtain the noise generation model by using the first data set and the second data set comprises:
training the noise generation network and the discrimination network alternately;
wherein when training the noise generation network, parameters of the discrimination network remain unchanged; and when training the discrimination network, parameters of the noise generation network remain unchanged.

4. The image denoising method according to claim 3, wherein the training the noise generation network comprises:
inputting the first image into the noise generation network to obtain a first generated image with simulated noise;
inputting the first generated image into the discrimination network to obtain a first discrimination result;
obtaining a first loss in accordance with the first image, the first generated image and the first discrimination result; and
performing parameter adjustment on the noise generation network in accordance with the first loss.

5. The image denoising method according to claim 4, wherein the training the discrimination network comprises:
inputting the first image into the noise generation network after parameter adjustment, and outputting a second generated image with simulated noise;
inputting the second generated image into the discrimination network to obtain a second discrimination result;
inputting the second image into the discrimination network to obtain a third discrimination result;
obtaining a second loss in accordance with the second discrimination result and the third discrimination result; and
performing parameter adjustment on the discrimination network in accordance with the second loss.

6. The image denoising method according to claim 5, wherein,
the inputting the first generated image into the discrimination network to obtain the first discrimination result comprises:
inputting the first generated image into a Gaussian high-pass filter to obtain a first intermediate image; and
inputting the first intermediate image into the discrimination network to obtain the first discrimination result;
the inputting the second generated image into the discrimination network to obtain the second discrimination result comprises:
inputting the second generated image into the Gaussian high-pass filter to obtain a second intermediate image; and
inputting the second intermediate image into the discrimination network to obtain the second discrimination result;
the inputting the second image into the discrimination network to obtain the third discrimination result comprises:
inputting the second image into the Gaussian high-pass filter to obtain a third intermediate image; and
inputting the third intermediate image into the discrimination network to obtain the third discrimination result.

7. The image denoising method according to claim 6, wherein, the first loss comprises a color loss, a perceptual loss and a texture loss, and the color loss is obtained through the following steps:
inputting the first image and the first generated image into a Gaussian low-pass filter to obtain a first filtered image and a first generated filtered image; and
obtaining the color loss in accordance with the first filtered image and the first generated filtered image.

8. The image denoising method according to claim 7, wherein the first loss is calculated through the following formulas:

$$L_G = L_{col} + \alpha L_{tex} + \beta L_{per},$$
$$L_{col} = \left(\sum_1^n \|F_L(G(x^{(i)})) - F_L(x^{(i)})\|_1\right)/n,$$
$$L_{tex} = \left(\sum_1^n \log(1 - D(F_H(G(x^{(i)}))))\right)/n,$$
$$L_{per} = \left(\sum_1^n \frac{1}{C_j H_j W_j} \|\varphi_j(G(x^{(i)})) - \varphi_j(x^{(i)})\|_2^2\right)/n$$

wherein, $L_G$ is the first loss, $L_{col}$ is the color loss, $L_{tex}$ is the texture loss, $L_{per}$ is the perceptual loss, n represents the number of images inputted in one iteration during training, a value range of i is [1, n], $X^{(i)}$ represents an i-th first image, $F_L$ represents a low-frequency feature obtained through Gaussian low-pass filtering, $F_H$ represents a high-frequency feature obtained through Gaussian high-pass filtering, D represents the discrimination network, G represents the noise generation network, j represents a j-th layer of a VGG network, $1/C_j H_j W_j$ represents a size of a feature map of the j-th layer of the VGG network, and Φ represents the VGG network.

9. The image denoising method according to claim 8, wherein the second loss is calculated through the following formula:

$$L_D = (\Sigma_1^n [\log(1-D(F_H(G(x^{(i)})))) + \log(-D(F_H(y^{(i)})))])/n$$

wherein $L_D$ is the second loss, and y represents the second image.

10. The image denoising method according to claim 3, wherein, the noise generation network comprises 12 residual sub-networks, each residual sub-network comprises a first convolutional layer and a second convolutional layer, an input end of the first convolutional layer is an input end of the residual sub-network, an output end of the first convolutional layer is connected to an input end of the second convolutional layer after a Rectified Linear Units (Relu) activation processing is performed on the output end of the first convolutional layer, an output end of the second convolutional layer is used as an output end of the residual sub-network, and the input end and the output end of the residual sub-network are connected to each other.

11. A non-transitory computer readable storage medium storing therein an image denoising program, wherein the image denoising program is executed by a processor to implement:

acquiring a first data set and a second data set, wherein the first data set comprises a plurality of first images without noise, the second data set comprises a plurality of second images with real noise, contents of each first image and each second image are different;

training, by using the first data set and the second data set, a first network to obtain a noise generation model;

inputting the first image into the noise generation model, and outputting a third image with simulated noise, wherein a plurality of third images forms a third data set; and training, by using the first data set and the third data set, an image denoising network to obtain an image denoising model;

wherein the image denoising model is configured to convert an original image with noise into an output image without noise;

wherein, the image denoising program is further executed by the processor to implement:

converting the first image into a first training sample image;

inputting the first training sample image into the noise generation model and outputting the third image, wherein a resolution of the first image is larger than a resolution of the first training sample image, and a resolution of the third image is the same as the resolution of the first training sample image;

wherein the image denoising model is further configured to convert the original image with noise and having a first resolution into the output image without noise and having a second resolution, and the first resolution is smaller than the second resolution.

12. The non-transitory computer readable storage medium according to claim 11, wherein the training the first network to obtain the noise generation model by using the first data set and the second data set comprises:

cutting or scaling the first image in the first data set to obtain a fourth image, wherein a plurality of fourth images forms a fourth data set;

cutting or scaling the second image in the second data set to obtain a fifth image, wherein a plurality of fifth images forms a fifth image data set;

training, by using the fourth data set and the fifth data set, the first network to obtain the noise generation model.

13. The non-transitory computer readable storage medium according to claim 11, wherein, the first network comprises a noise generation network and a discrimination network, and the image denoising program is further executed by a processor to implement:

training the noise generation network and the discrimination network alternately;

wherein when training the noise generation network, parameters of the discrimination network remain unchanged; and when training the discrimination network, parameters of the noise generation network remain unchanged.

14. The non-transitory computer readable storage medium according to claim 13, wherein the training the noise generation network comprises:

inputting the first image into the noise generation network to obtain a first generated image with simulated noise;

inputting the first generated image into the discrimination network to obtain a first discrimination result;

obtaining a first loss in accordance with the first image, the first generated image and the first discrimination result; and performing parameter adjustment on the noise generation network in accordance with the first loss;

wherein the training the discrimination network comprises:

inputting the first image into the noise generation network after parameter adjustment, and outputting a second generated image with simulated noise;

inputting the second generated image into the discrimination network to obtain a second discrimination result;

inputting the second image into the discrimination network to obtain a third discrimination result;

obtaining a second loss in accordance with the second discrimination result and the third discrimination result; and performing parameter adjustment on the discrimination network in accordance with the second loss.

15. The non-transitory computer readable storage medium according to claim 14, wherein the inputting the first generated image into the discrimination network to obtain the first discrimination result comprises:

inputting the first generated image into a Gaussian high-pass filter to obtain a first intermediate image; and inputting the first intermediate image into the discrimination network to obtain the first discrimination result;

the inputting the second generated image into the discrimination network to obtain the second discrimination result comprises:

inputting the second generated image into the Gaussian high-pass filter to obtain a second intermediate image; and inputting the second intermediate image into the discrimination network to obtain the second discrimination result;

the inputting the second image into the discrimination network to obtain the third discrimination result comprises:

inputting the second image into the Gaussian high-pass filter to obtain a third intermediate image; and inputting the third intermediate image into the discrimination network to obtain the third discrimination result.

16. The non-transitory computer readable storage medium according to claim 15, wherein the first loss is calculated through the following formulas:

$$L_G = L_{col} + \alpha L_{tex} + \beta L_{per},$$

$$L_{col} = (\Sigma_1^n \|F_L(G(x^{(i)})) - F_L(x^{(i)})\|_1)/n,$$

$$L_{tex} = (\Sigma_1^n \log(1 - D(F_H(G(x^{(i)})))))/n,$$

wherein, $L_G$ is the first loss, $L_{col}$ is the color loss, $L_{tex}$ is the texture loss, $L_{per}$ is the perceptual loss, n represents the number of images inputted in one iteration during training, a value range of i is [1, n], $X^{(i)}$ represents an i-th first image, $F_L$ represents a low-frequency feature obtained through Gaussian low-pass filtering, $F_H$ represents a high-frequency feature obtained through Gaussian high-pass filtering, D represents the discrimination network, G represents the noise generation network, j represents a j-th layer of a VGG network, $1/C_j H_j W_j$ represents a size of a feature map of the j-th layer of the VGG network, and $\Phi$ represents the VGG network.

17. The non-transitory computer readable storage medium according to claim 16, wherein the second loss is calculated through the following formula:

$$L_D = (\Sigma_1^n [\log(1 - D(F_H(G(x^{(i)})))) + \log(-D(F_H(y^{(i)})))])/n$$

wherein $L_D$ is the second loss, and y represents the second image.

18. An electronic device, comprising: a memory, a processor and an image denoising program stored on the memory and executable on the processor, wherein the image denoising program is executed by the processor to implement:

acquiring a first data set and a second data set, wherein the first data set comprises a plurality of first images without noise, the second data set comprises a plurality of second images with real noise, contents of each first image and each second image are different;

training, by using the first data set and the second data set, a first network to obtain a noise generation model;

inputting the first image into the noise generation model, and outputting a third image with simulated noise, wherein a plurality of third images forms a third data set; and training, by using the first data set and the third data set, an image denoising network to obtain an image denoising model;

wherein the image denoising model is configured to convert an original image with noise into an output image without noise;

wherein the image denoising program is executed by the processor to implement:

converting the first image into a first training sample image;

inputting the first training sample image into the noise generation model and outputting the third image, wherein a resolution of the first image is larger than a resolution of the first training sample image, and a resolution of the third image is the same as the resolution of the first training sample image;

wherein the image denoising model is further configured to convert the original image with noise and having a first resolution into the output image without noise and having a second resolution, and the first resolution is smaller than the second resolution.

* * * * *